Figure 1:
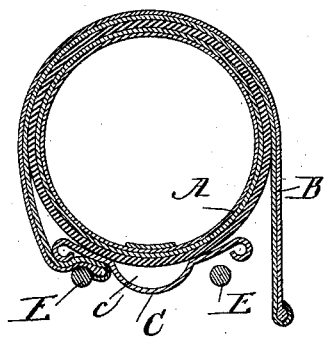

(No Model.) 3 Sheets—Sheet 1.

F. DOUGLAS.
VEHICLE TIRE.

No. 472,341. Patented Apr. 5, 1892.

Witnesses:
Clifford H. White
Samuel E. Hibben

Inventor:
Frank Douglas,
By Banning & Banning & Payson
Attorneys (No Model.) 3 Sheets—Sheet 2.

F. DOUGLAS.
VEHICLE TIRE.

No. 472,341. Patented Apr. 5, 1892.

Witnesses
Clifford H. White
Samuel E. Hibben

Inventor:
Frank Douglas.
By Banning & Banning and Payson
Attorneys (No Model.) 3 Sheets—Sheet 3.

F. DOUGLAS.
VEHICLE TIRE.

No. 472,341. Patented Apr. 5, 1892.

Witnesses:
Clifford H. White
Samuel E. Hibben

Inventor:
Frank Douglas,
By Banning & Banning & Payson
Attorneys

UNITED STATES PATENT OFFICE.

FRANK DOUGLAS, OF CHICAGO, ILLINOIS.

VEHICLE-TIRE.

SPECIFICATION forming part of Letters Patent No. 472,341, dated April 5, 1892.

Application filed October 12, 1891. Serial No. 408,520. (No model.)

*To all whom it may concern:*

Be it known that I, FRANK DOUGLAS, a citizen of the United States, residing at Chicago, Illinois, have invented certain new and useful Improvements in Vehicle-Tires, of which the following is a specification.

The object of my invention has more especial reference to what are commonly known as "inflated flexible tubular tires," used particularly in bicycles, and is intended, in general terms, to secure greater flexibility or yielding capacity in the inner portion of the tire, where it rests against the rim of the wheel, than at the other portions of the tire; and my invention consists in the features and details of construction hereinafter described and claimed.

Heretofore, so far as I have been able to learn, no inflated tire has ever been made in which the inner portion of the tire, where it rests against the rim of the wheel, has had the capacity of yielding under pressure without bending the tire throughout all of the layers of which it is formed to the same extent and in the same degree that the inner layers are bent and compressed. In such tires no arrangement or provision was made to enable simply the inner layers, composing the tube, to yield under pressure without correspondingly bending the outer layers. This construction and arrangement of tire, in which all of the layers composing it are required to yield correspondingly and to the same degree, diminishes the amount of flexibility or yielding capacity that may be secured in a tire, so that large tires are required where it is desired to secure great flexibility. In my improved tire, however, I have arranged to secure the yielding under pressure of only the inner layers of the tire, while the outer layers are used to secure the tire to the rim and yet at the same time increase the thickness of the tire to prevent puncture or wearing where the tire comes in contact with the ground. This result is secured by separating the outer and the inner layers of the tire at that portion of the tube which lies next the rim of the wheel, so that the rim bears only against the inner layers, and so that the outer layers are used to fasten or tie, as it were, the tires to the rim. This result is also further increased by making the rim of a larger curve than the curve of the inner layers of the tire, so that the tire will only bear against the rim along its central portion.

With these general statements of the construction of inflated tires as heretofore made and as now generally used, and the distinctive features of my improved tire, I will proceed to a more minute and detailed description of my invention.

Figure 2:
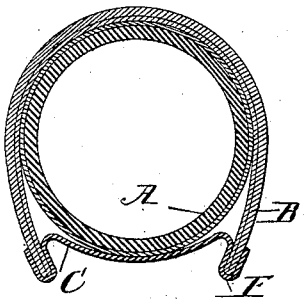
Figure 3:
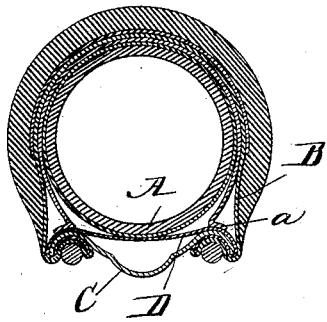
Figure 4:
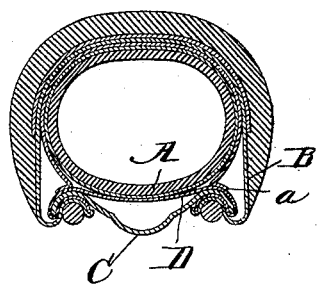
Figure 5:
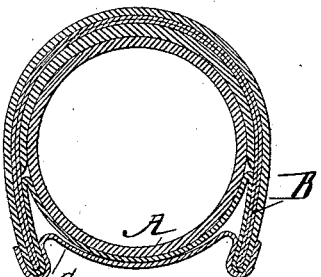
Figure 6:
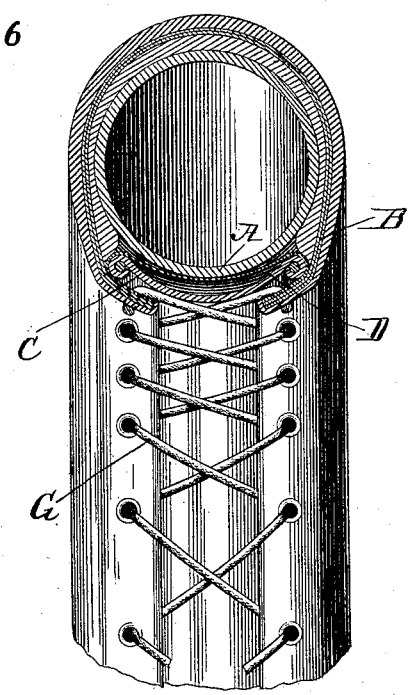
Figure 7:
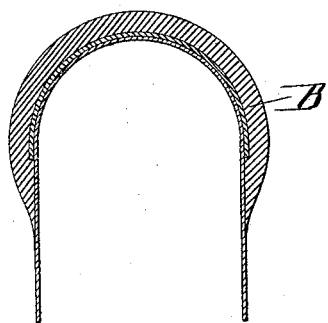
Figure 8:
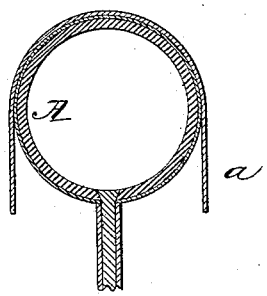
Figure 9:
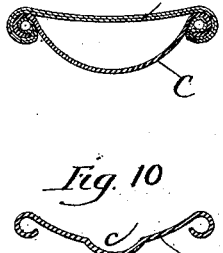
Figure 10:
Figure 11:
Figure 12:
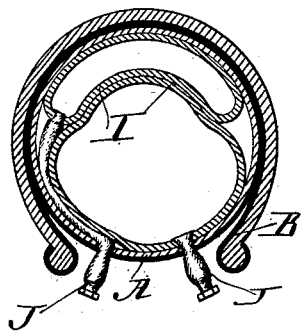
Figure 13:
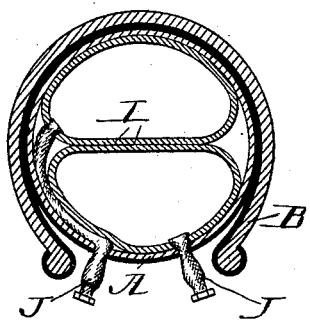
Figure 14:
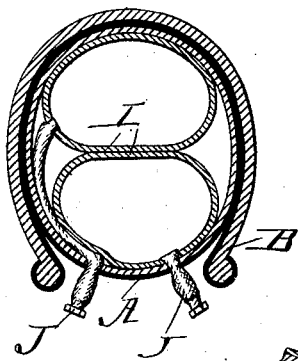
Figure 15:
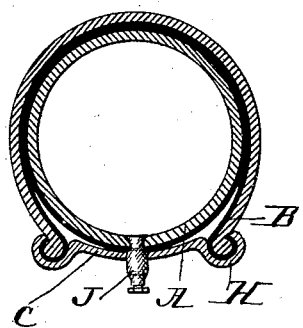
Figure 16:
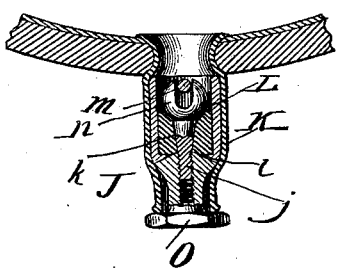

In the drawings, Figure 1 shows a section of my improved tire with the outer layer at one side fastened to the rim by one method of fastening. Fig. 2 shows the outer layer fastened at both sides. Figs. 3 and 4 show the outer layers fastened by the method shown in Fig. 1 and with the tube in Fig. 4 compressed, but with a flexible bridge extending across from edge to edge of the rim on which the inner tube rests. Fig. 5 shows the method of fastening in Fig. 2, except with the cloth of the outer layer turned in and across for the inner tube to rest upon. Fig. 6 is a perspective view of a portion of my improved tire with the fastening to the rim slightly modified over that shown in Fig. 5 and showing the outer layers of the tire laced together across the rim of the wheel. Fig. 7 shows a section of the outer layer shown in Figs. 3 and 4, but detached from the tube. Fig. 8 shows the inner tube of Figs. 3 and 4 detached, with one layer of cloth hanging at the ends. Fig. 9 shows a section of the wheel-rim with a flexible bridge across for the inner layers of the tire to rest upon. Figs. 10 and 11 show different forms of the rims of wheels, similar to Figs. 1 and 2. Fig. 12 shows a section of tire provided with double internal tubes with the lower inflated. Fig. 13 shows the same with the inner tubes uninflated. Fig. 14 shows the same with the inner tubes inflated. Fig. 15 shows a tire like those shown in the last three figures, but without the inner tubes; and Fig. 16 shows the valve in an enlarged form by which the tires are inflated.

In making my improved tire, of which I have shown various modifications in detail, I make a tube of the proper size consisting of a desired number of layers of rubber and cloth alternating, so as to afford as much strength, flexibility, and wearing capacity for the weight as possible. I prefer to cement these layers together, so that they will form, practically, an integral structure. The outer layer or layers, however, are left detached from the inner layers throughout that portion which when the tire is applied will be toward the wheel. For convenience I shall hereinafter speak of the inner layers as the "inner tube" and designate them by the letter A, and the outer layers as the "outer tube" and designate them by the letter B. When the tire thus formed is ready to be applied to the rim of a wheel, it presents the appearance of a tube with the outer layers extending only partially around and with their edges detached or depending from the balance of the tube, ready to be fastened to the rim of the wheel. The rim C of the wheel may be made in various forms, of which I have shown several; but I prefer to make them in cross-section, and of a greater curve than the curve of the inner tube A of the tire in cross-section. In some cases I stretch and fasten a flexible bridge D across the rim of the wheel for the inner tube to rest upon, as shown in Figs. 3, 4, 6, and 9. This flexible bridge may either be of a separate piece or a piece of cloth or webbing extending from the layers, forming the outer tube B of the tire, as in Fig. 6; but whether the inner tube of the tire rests directly upon the rim of the wheel or upon a flexible bridging, as above described, it is desired that the rim or bridging bear against only the central portion of the tube and that its curve be greater than the curve of the tube, so that the rim will not encircle or embrace the tube throughout its entire extent in cross-section. This arrangement is intended to secure increased flexibility in the tube, inasmuch as there can be no flexibility in that portion of the tube which is encircled or embraced closely by the metallic rim of the wheel, and it is for this reason that I make the curve of the rim greater than the curve of the inner tube. In some cases where the bridge is not shown the rim appears to have a groove or depression under the seat of the inner tube, as in Figs. 1, 10, and 11. I desire to say, however, that this groove or channel is intended to be filled with tire-cement after the spokes are in, so that it will present a smooth curve throughout its entire cross-section. Where the bridge is used, the outer layer of cloth a of the inner tube A may be left detached, as shown in Fig. 8, and attached to the bridge by sewing or otherwise, as shown in Figs. 3 and 4. When it is desired to attach the tire to the rim of a wheel, the tube is placed in position in the rim and the depending edges of the outer tube B fastened securely to the rim. There are various methods by which this fastening is effected, and I have shown different ways of doing it. In Figs. 1, 3, and 4 I have shown the edges of the outer tube fastened to the rim of the wheel by means of a ring or wire E, which serves to hold them securely in place. In Figs. 2 and 5 I have shown the edges as clamped between U-shaped recesses F in the outer edges of the rim. In Fig. 6 I have shown the edges fastened by lacing G across the rim of the wheel. In Figs. 12, 13, 14, and 15 I have shown the tire adapted to be fastened as in Fig. 15, where the edges are held in a circular clamp H of the rim. Any desired way of fastening the outer tube of the tire at its detached edges may be employed, so long as it does not interfere with the free flexibility of the inner tube of the tire. By thus using the detached edges of the outer tube to tie or fasten the tire in place by attachment at the outer edges of the rim the tire is held in its true central position and prevented from rolling from such central position to one side or the other.

After the tire is in place it may be inflated by forcing air in through an appropriate valve. In Figs. 12, 13, and 14 I have shown inflating-tubes I arranged within the inner tube A. I have shown two such inflating-tubes, so that one may be inflated without the other, or so that both may be inflated at the same time, if desired. These inflating-tubes are preferably cemented together where they lie in contact and cemented to the inner tube where they come in contact with it. When both tubes are inflated, as shown in Fig. 14, they will cause the tire to assume a somewhat elongated form in vertical cross-section. This results from the cementing of the inflating-tubes to the inner tubes where the same lie in contact, which causes the uncemented sides of the tube to approach the inflating-tubes when the same are filled with air under pressure. By thus elongating the tube in vertical cross-section greater flexibility is secured between the rim of the wheel and the surface of the ground. When both of the inflating-tubes are filled, as in Fig. 14, if by any accident the tire should be punctured through from the ground, so as to permit the air to escape from the outer tube, the tire would assume a rounded form, as shown in Fig. 12, where the outer tube would be doubled upon itself and the tire would still be as capable of use as the ordinary inflated tire.

From the above description it will be apparent that there are running through all the forms shown in the various figures of the drawings two distinctive features. The first of these is the making of the outer tube B detached from the inner tube along that portion toward the wheel and using the detached edges as the means of attaching the tire to the rim. The second is the making of the rim of a greater curve than the curve of the inner tube A of the tire, where it rests upon the rim, so that the rim will tightly embrace or encircle the tube throughout its entire extent and cross-section. Both of these features contribute to the result of greatly increased flexibility in the tire between the rim and the ground, so that in a tire of a given size, according to my improvements, a much greater flexibility will exist than in the same-sized tired constructed and attached as in the ordinary method.

In order to inflate my improved tires, I have shown in Figs. 12 to 16 a valve J. The difficulty with valves heretofore has mostly resulted from their leaking, so that the tires ceased to be tightly inflated and worthless for use. In the valve shown by me I have endeavored to overcome and prevent this difficulty and objection, as well as to provide a valve that will permit the tire to be deflated when desired.

In making my valve (shown in detail in Fig. 16) I make a rubber or flexible tube K, which is cemented or otherwise securely fastened to the inner tube of the tire, opening on its inside. I make a tube or shell L, of brass or other material, that is preferably larger in diameter than the flexible tube K in its normal size, and secure it in position. If desired, it may be cemented to the rubber tube K. I turn in the outer end of this shell, as at $l$, and seat a rubber block or other compressible and expandible valve-seat $k$ in the tube L, provided with a hole through it. A ball or other shaped valve N is also arranged in the tube and provided with a stem $j$, screw-threaded at its outer end and preferably tapering through the block of rubber, so that it is larger at the valve end than in its screw-threaded portion. The valve N is held in place and prevented from turning around by a pin $m$, arranged in a slot in the upper portion of the valve, which permits the valve to be moved in or out within the limits of the slot, but not to become displaced or turned around. A nut O is arranged to be screwed onto the stem $j$ of the valve and its inner end when screwed into place pressed tightly against the end of the tube K and the rubber block M. When it is desired to inflate the tube, the nut O is removed, which loosens the valve, and air is forced in until the tube is inflated to the desired extent. The nut is then screwed on, drawing the valve N tightly down against and into the upper end of the block M, while the inner end of the nut, when fully screwed in, bears against the outer end of the rubber block. As the stem $j$ of the valve increases in size toward the valve it spreads the rubber block as the nut O draws it tightly into place. In this way the rubber seat or block is compressed tightly against the tube L and the valve and the nut, so that leakage becomes impossible. After the tube has been once inflated, if for any reason it be desired to deflate it, all that is necessary is to loosen the screw O and press the stem of the valve N in, so as to lift the valve from its seat, when the air will escape around the stem.

What I regard as new, and desire to secure by Letters Patent, is—

1. In inflatable vehicle-tires, an inner tube and an outer tube having its outer edges detached from the inner tube to permit of attachment to the wheel-rim, in combination with a wheel-rim provided with a flexible bridge against which the inner tube rests, substantially as described.

2. In inflatable vehicle-tires, an inner tube and an outer tube having its outer edges detached from the inner tube to permit of attachment to the wheel-rim, in combination with a wheel-rim provided with a flexible bridge formed by extending one of the layers composing the outer tube across the wheel-rim and against which the inner tube rests, substantially as described.

3. In inflatable vehicle-tires, an inner tube and an outer tube having its outer edges detached from the inner tube to permit of attachment to the wheel-rim, in combination with a wheel-rim of a curve greater than the curve of the inner tube at the point of contact therewith, provided with grooves or channels in which the edges of the outer tube rest and are clamped, substantially as described.

4. In inflatable vehicle-tires, a valve for inflating and deflating the tube, consisting of a tube opening into the inflatable tube, a shell arranged in such tube and turned in at the outer end, a compressible and expandible valve-seat arranged within the shell against its inturned outer end, a valve that may be drawn against or receded from the seat to prevent or permit the egress of air, a pin for holding said valve from turning while permitting it to be drawn or receded from the valve-seat, and a nut for holding the valve securely against the seat, substantially as described.

FRANK DOUGLAS.

Witnesses:
THOMAS A. BANNING,
ANNIE C. COURTENAY.